US005870385A

United States Patent [19]

Ahmadi et al.

[11] Patent Number: 5,870,385

[45] Date of Patent: *Feb. 9, 1999

[54] ALLOCATION METHOD AND APPARATUS FOR REUSING NETWORK RESOURCES IN A WIRELESS COMMUNICATION SYSTEM

[75] Inventors: Hamid Ahmadi, Somers; David Bantz, Chappaqua, both of N.Y.; Frederic Bauchot, Saint Jeannet, France; Colin Harrison, Brookfield, Conn.; Arvind Krishna, Briarcliff Manor, N.Y.; Jose Louis Martinez, Antibes, France; Kadathur Natarajan, Millwood, N.Y.; Michelle Wetterwald, Cagnes Sur Mer, France

[73] Assignee: International Business Machines Corporation, Armonk, N.Y.

[*] Notice: The term of this patent shall not extend beyond the expiration date of Pat. No. 5,781,536.

[21] Appl. No.: 798,817

[22] Filed: Feb. 12, 1997

Related U.S. Application Data

[63] Continuation of Ser. No. 468,155, Jun. 6, 1995, Pat. No. 5,781,536.

[30] Foreign Application Priority Data

Oct. 26, 1994 [EP] European Pat. Off. ............... 94480114

[51] Int. Cl.⁶ .............................. H04J 13/06; H04Q 7/36
[52] U.S. Cl. .......................... 370/252; 375/202; 455/447
[58] Field of Search .................................... 370/252, 328, 370/335, 342, 343, 344, 441, 480; 375/202; 455/423, 446, 447, 453

[56] References Cited

U.S. PATENT DOCUMENTS 5,212,831  5/1993  Chuang et al. ..................... 455/54.1
5,257,398 10/1993  Schaeffer ........................... 455/447
5,301,188  4/1994  Kotzin et al. ...................... 455/447
5,394,433  2/1995  Bantz et al. ........................ 375/202
5,404,574  4/1995  Benveniste ........................ 455/447
5,437,056  7/1995  Rautiola ............................ 455/34.1
5,455,821 10/1995  Schaeffer et al. .................. 370/252
5,603,085  2/1997  Shedlo ................................. 455/62

FOREIGN PATENT DOCUMENTS 2114570 10/1994  Canada .......................... H04B 7/24
0528522  6/1992  European Pat. Off. .......... H04B 7/26

*Primary Examiner*—Melvin Marcelo
*Attorney, Agent, or Firm*—Joscelyn G. Cockburn

[57] ABSTRACT

In a wireless communication system (106), base stations (118, 120) are connected to a backbone network (116) such as a wired LAN and act as access points and relays for remote stations (128, 132, 136). A remote station registers and performs bidirectional communication with one of the base stations designated as its home base station. Base stations have overlapping coverage areas where a remote station is within reception range of several base stations. Such communication system may for instance be a multicell radio LAN using frequency hopping signaling. The method allows reuse of a limited number of network resources such as frequency hopping patterns and assign the same resource to several active base stations. Upon request from a base station, a network controller (110) connected to the backbone network computes a distance index between the requesting base station and the other active base stations and assigns to the requesting base station the same network resource as the one assigned to another base station with the highest distance index. Information about cells overlaps is centralized in a control database (109) and used by the network controller to compute distance indexes.

3 Claims, 15 Drawing Sheets

ALLOCATION METHOD AND APPARATUS FOR REUSING NETWORK RESOURCES IN A WIRELESS COMMUNICATION SYSTEM

This is a continuation of application Ser. No. 08/468,155 filed on Jun. 6, 1995 now U.S. Pat. No. 5,781,536.

FIELD OF THE INVENTION

This invention relates generally to communications systems and, in particular such communications in a wireless local area network (LAN). Specifically, the invention is directed to assignment of network resources in communication systems using shared multiple access communication media, such as, for instance, frequency hopping patterns, in a multicell radio LAN based on slow frequency hopping spread spectrum signaling.

BACKGROUND OF THE INVENTION

In a wireless LAN network various configuration parameters or network resources have to be maintained and distributed as base stations and remote stations enter or leave the network. A typical wireless LAN topology is divided into cells. Associated with each cell is a base station connected to a backbone network which acts as an access point and relay for remote stations. To become part of the network, remote stations have to register with one of the base stations. All communications between the remote station and other entities are subsequently handled by the base station with which the remote station has registered. For instance a multicell radio LAN installation based on slow frequency hopping spread spectrum signaling may consist of a set of base stations with overlapping coverage areas. In a frequency hopping (FH) system, the carrier frequency of the transmitter changes at intervals of time, remaining constant between those instants. The period of constant frequency is called a hop and messages may be exchanged during these hops. Efficient methods for controlling and minimizing radio interference between overlapping cells are essential to the reliability and performance of such radio LAN installations. The transmission and reception of messages in a cell of a multicell network of the type that employs identical communication frequencies in different cells, requires control of interference between users. This interference may occur from several sources including transmission from remote stations that lie in overlapping areas between adjacent cells and transmissions from base stations if these overlapping cell areas contain one or more remote users. Assigning different frequency hopping sequences or patterns to base stations with overlapping coverage areas allows control and limit interferences.

The following U.S. Patents and European Patent applications teach various aspects of mobile communications using wireless transmission media.

U.S. Pat. No. 5,239,673 teaches a scheduling method for efficient frequency reuse in a multi-cell wireless network served by a wired local area network. One method of the invention circulates a high priority token among a plurality of header stations connected to the wired network. Reception of the token causes the receiving header station to perform wireless communications. When finished, the header station forwards the token to another header station.

The following two U.S. Patents show communication systems having overlapping coverage areas: U.S. Pat. No. 4,597,105, Jun. 24, 1986, entitled "Data Communications System having Overlapping Receiver coverage Zones" to Freeburg and U.S. Pat. No. 4,881,271 issued Nov. 14, 1989, entitled "Portable Wireless Communication Systems" to Yamauchi et al. provide for a hand-off of a subscriber station from one base station to another by the base station continually monitoring the signal strength of the subscriber station.

The following U.S. Patents teach various aspects of wireless communication networks.

In U.S. Pat. No. 4,792,942, issued Dec. 20, 1988 entitled "Wireless Local Area Network for Use in Neighborhoods" S. Mayo describes a local area network that includes transceiver stations serially coupled in a loop.

In U.S. Pat. No. 4,730,310 issued Mar. 8, 1988 entitled "Terrestrial Communications Systems" Acampora et al. describe a communications system that employs spot beams, TDMA and frequency reuse to provide communication between a base station and remote stations.

In U.S. Pat. No. 4,639,914, issued Jan. 27, 1987 entitled "Wireless PBX/LAN System with Optimum Combining" Winters discloses a wireless LAN system that employs adaptive signal processing to dynamically reassign a user from one channel to another.

In U.S. Pat. No. 4,926,495, issued May 15, 1990 entitled "Computer Aided Dispatch System" Comroe et al. disclose a computer aided dispatch system that includes a master file node and a plurality of user nodes. The master file node maintains a record for each subscriber and automatically transmits an updated record to each dispatcher attached to a subgroup in which the subscriber operates.

In U.S. Pat. No. 4,456,793, issued Jun. 26, 1984 W. E. Baker et al. describe a cordless telephone system having infrared wireless links between handsets and transponders. The transponders are wired to subsystem controllers that are in turn wired to a system controller. The central controller polls the cordless stations every 100 milliseconds to detect cordless station locations and to identify "missing" cordless stations.

In U.S. Pat. No. 4,807,222, issued Feb. 21, 1989 N. Amitay described a LAN in which users communicate with RF or IR signals with an assigned Regional Bus Interface Unit (RBIU). Protocols such as CSMA/CD and slotted ALOHA are employed in communicating with the RBIUs.

In U.S. Pat. No. 4,402,090 issued Aug. 30, 1983, F. Gfeller et al. describe an infrared communication system that operates between a plurality of satellite stations and a plurality of terminal stations. A host computer communicates with the terminal stations via a cluster controller and the satellite stations, which may be ceiling mounted. Communication with the terminal stations is not interrupted even during movement of the terminal stations.

In IBM Technical Disclosure Bulletin, vol. 24, No 8, page 4043, January 1982 F. Gfeller describes general control principles of an infrared wireless network incorporating multiple ceiling mounted transponders that couple a host/controller to multiple terminal stations. Access to the uplink channel is controlled by a Carrier Sense Multiple Access/Collision Detection (CSMA/CD) method.

What is not taught in the prior art is a method for reusing frequency hopping patterns thus allowing operation of frequency hopping wireless LAN's with a number of base stations greater than the number of existing frequency hopping patterns. More generally such method applies to the allocation of other kinds of network resources, such as a limited pool of remote stations addresses. In addition the method of the invention applies as well to wireless systems using different signalling techniques such as for instance direct sequence spread system radio frequency signalling or infrared and more generally to any communication system using a multiple access shared communication medium.

SUMMARY OF THE INVENTION

The invention as defined is to provide a method for reusing a limited number of network resources in a communication system using a multiple access shared communication medium such as a wireless radio frequency (RF) or infrared (IR) communication network coupled to a local area network connected to a plurality of base stations. Each base station has a geographic area, defined as a cell, within which remote stations are within reception range. Remote stations select one base station as home base station. Home base stations are capable of performing bidirectional communication with one or more remote stations under control of a controller connected to said local area network, the method of the invention comprises the steps of:

(a) requesting by a given base station assignment by said controller of one of said network resources; and (b) selecting and assigning by said controller one of said network resources;

This method allows selecting and assigning one of the network resources already assigned to one or more other base stations. Selection is based on the computation by the controller of a distance index between the given base station and the other base stations. The resource assigned to the given base station is the one already assigned to one of the other base stations with the highest distance index to the given base station.

In a wireless communication system using frequency hopping RF communication, this method is particularly suited to reuse frequency hopping patterns when the number of active base stations exceeds the number of available frequency hopping patterns. Assigning a frequency hopping pattern already in use by a base station with the highest distance index reduces the risk of interference between two base stations using the same frequency hopping pattern.

Another aspect of the invention is to compute distance index based on data representative of base stations cells overlaps. Such cells overlap occurs at locations where a remote station is within RF or IR reception range of several active base stations. Cells overlaps information is used by the controller to reuse a network resource to assign it to a requesting base station. The method used to compute a distance index between the requesting base station and the other active base stations comprises the following steps:

(a) setting the distance index of the other base stations to an initial maximum value;

(b) setting the distance index to 1 for first level neighbor base stations, first level neighbors being defined as base stations whose cell overlaps with the requesting base station cell; and (c) starting with n=1, performing a number of iterations consisting in setting the distance index to n+1 for (n+1)-th level neighbor base stations, (n+1)-th level neighbors being defined as base stations whose cell overlaps with the cell of a n-th level neighbor base station.

DESCRIPTION OF THE PREFERRED EMBODIMENT

Figure 1:
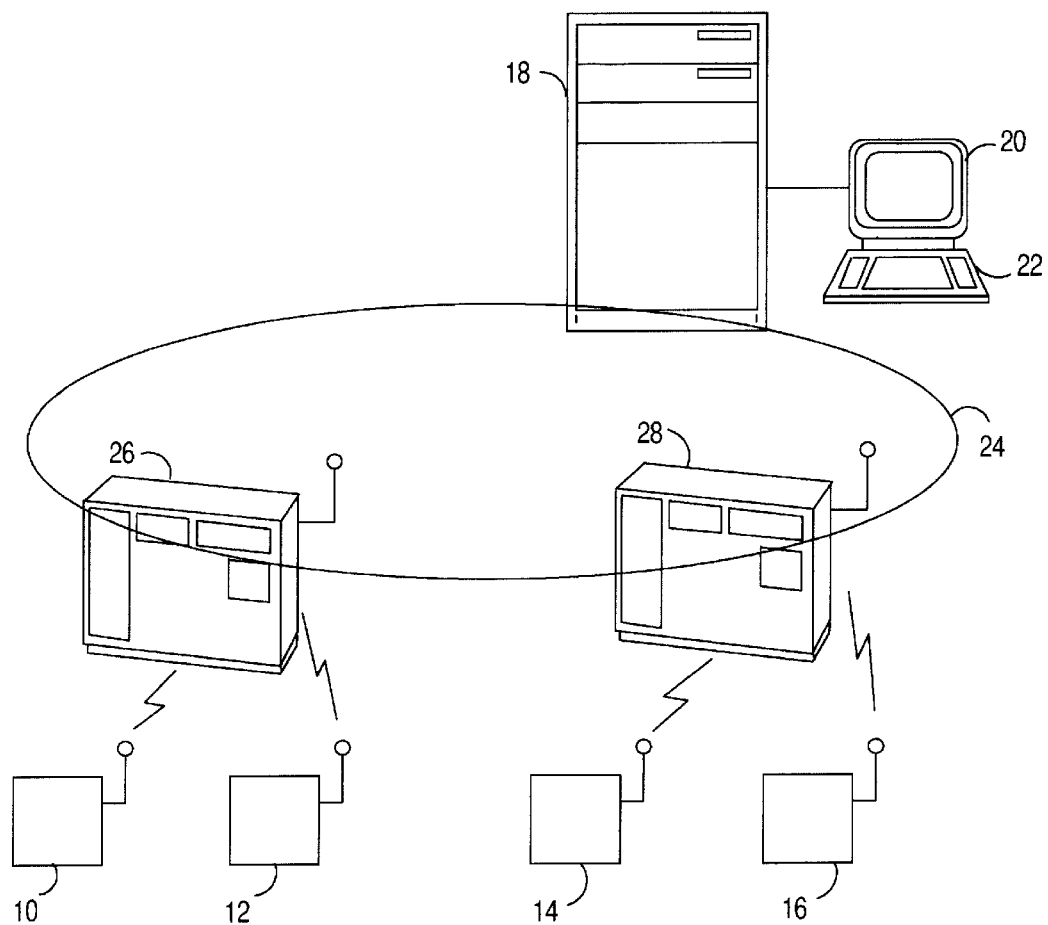
FIG. 1 is a pictorial diagram showing an indoor radio digital communications system of the type in which the invention is implemented.

Referring now to the drawings, and more particularly to FIG. 1, there is shown an indoor radio system allowing communication between a plurality of remote stations 10, 12, 14, and 16 and applications and data residing in a computing system. It is to be appreciated that other systems may be utilized in the practice of the invention. The computing system typically includes a Wireless Network Controller (WNC) 18, with attached monitor 20 and keyboard 22, of a local area network (LAN), generally indicated by reference numeral 24, having a plurality of attached workstations or personal computers (not shown for simplicity). Also attached to the LAN are one or more gateways 26 and 28 with which the remote stations 10, 12, 14, and 16 communicate. These gateways, referred to as base stations, are augmented according to the invention to provide certain radio system management functions which coordinate the remote stations' access to the common radio channel. Communications between remote stations is supported via relay through the base stations 26 and 28.

Figure 1A:
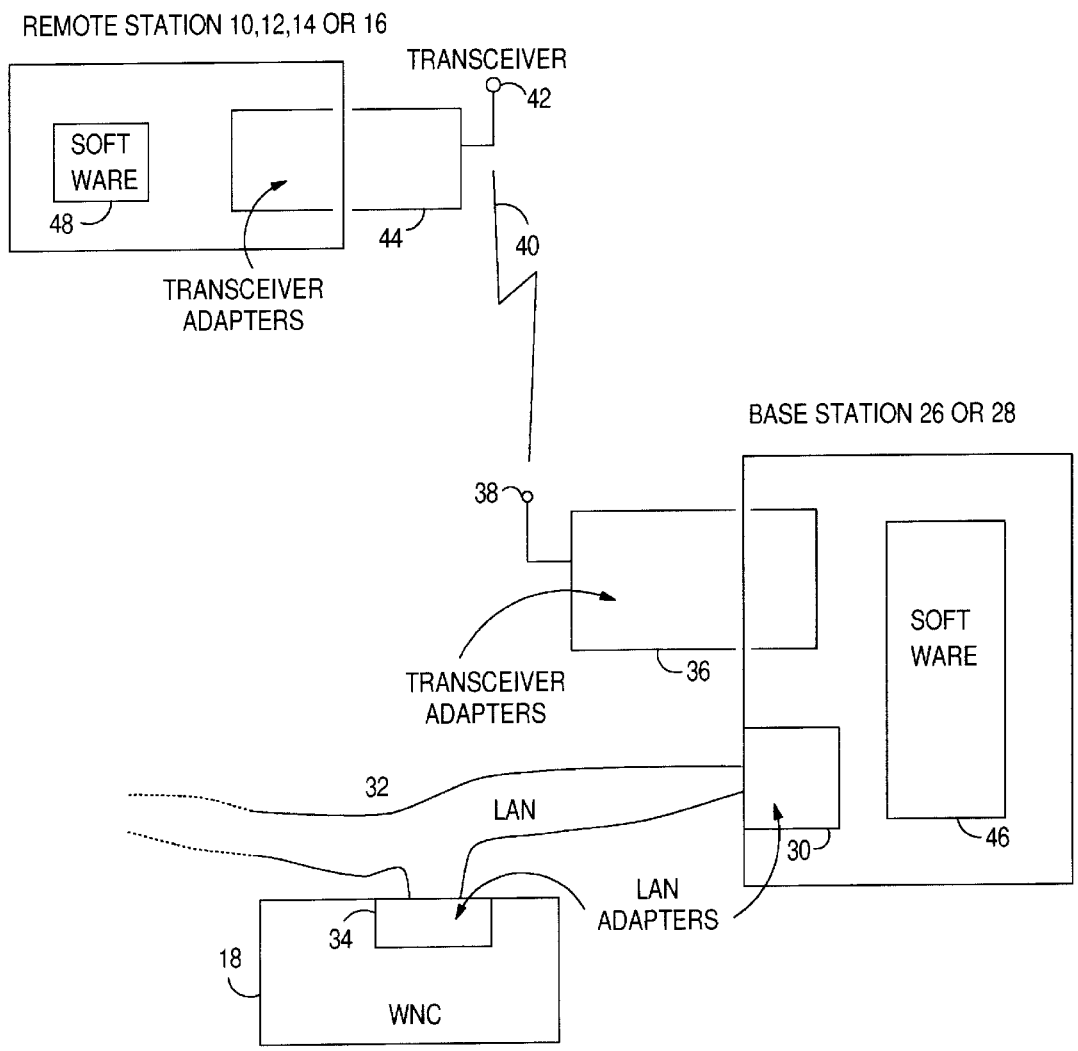
FIG. 1A is a block diagram of the system shown in FIG. 1 illustrating the basic components of a remote station and a base station.

As shown in more detail in FIG. 1A, a base station 26 or 28, which may be a conventional microcomputer, has a LAN adapter 30 inserted in a bus slot and connected to LAN cabling 32. The WNC 18, typically also a conventional microcomputer and including one or more direct access storage devices (DASDS) such as hard disks (not shown), also has a LAN adapter 34 inserted in a bus slot and connected to LAN cabling 32. The LAN adapters 30 and 34 and the LAN cabling 32 together with LAN software constitute the LAN 24. The LAN 24 is of conventional design and does not form part of the invention. The base station 26 or 28 also has an RF transceiver adapter 36 implemented as a printed circuit card which is inserted in a bus slot of the base station. The transceiver adapter 36 includes a spread spectrum transceiver of conventional design. The transceiver adapter 36 has an antenna 38 by which a radio link 40 is established with one or more remote stations, 10, 12, 14, or 16. The remote station may itself be a hand held or lap top computer of conventional design and, like the base station, it is provided with an antenna 42 and a transceiver adapter 44, which may also be implemented as a printed circuit card which is inserted in a bus slot of the computer. The transceiver adapter 44, like transceiver adapter 36, includes a spread spectrum transceiver of similar design. The base station and the remote stations are further provided with software, generally indicated by reference numerals 46 and 48, respectively, which support their respective transceiver adapters.

Figure 2:
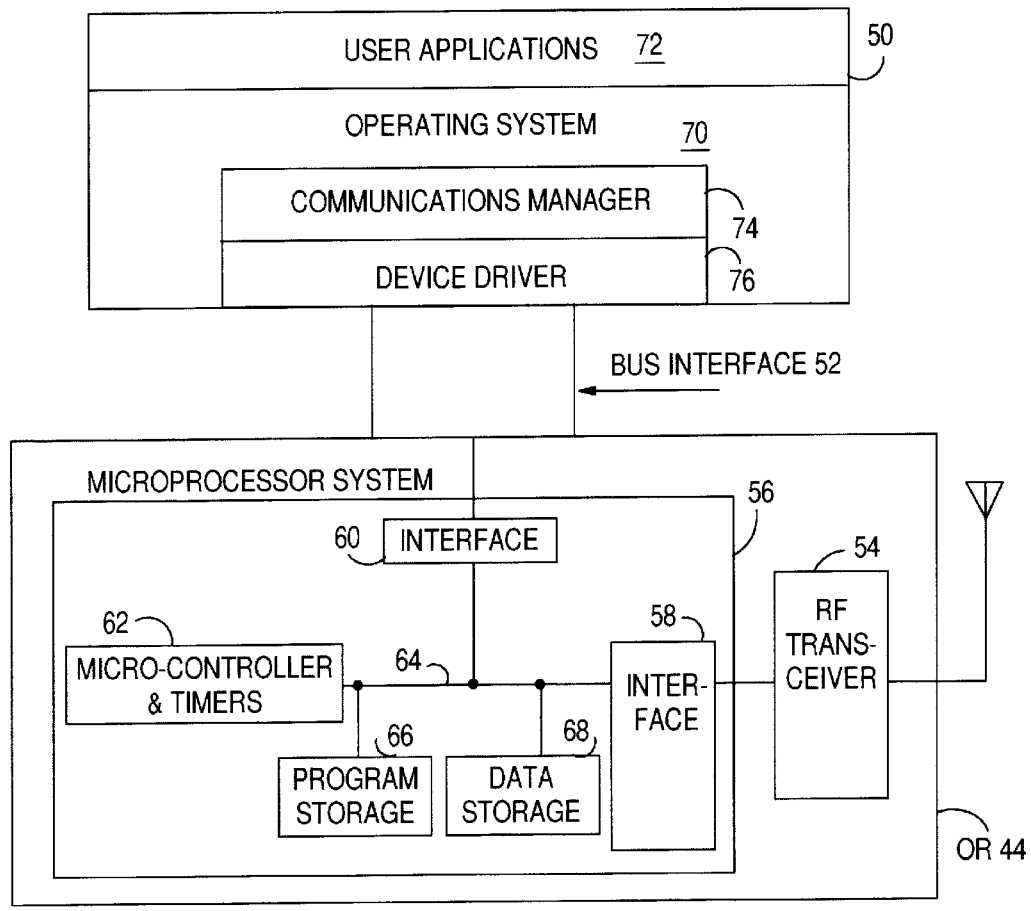
FIG. 2 is a block diagram of the radio system used in the implementation of a preferred embodiment of the invention.

FIG. 2 shows the radio system common to both the remote stations and the base stations of FIG. 1. The radio system includes a transceiver adapter 44 connected to the computer 50 via the computer's bus interface 52. The transceiver section is itself divided into an RF transceiver 54, which may be a commercially available spread spectrum transceiver, and a dedicated microprocessor system 56 which controls the transceiver via an interface 58. The microprocessor system 56 further includes a system interface 60 which interfaces the transceiver section to the computer section 50. The microprocessor system includes a dedicated microprocessor 62 containing high-resolution time interval determination hardware or "timers" typical of real-time microprocessor systems. Microprocessor 62 is connected by a memory bus 64 to program storage 66 and data storage 68 as well as to interfaces 60 and 58 providing attachment to bus interface 52 and RF transceiver 54, respectively. Program storage 66 is typically read only memory (ROM), while data storage 68 is static or dynamic random access memory (SRAM or DRAM). Packets received or to be sent are held in data storage 68 and communicated to or from the RF transceiver 54 via interface 58 under control of serial channels and a direct memory access (DMA) controller (not shown) which is part of the microprocessor 62. The function of these serial channels is to encapsulate data and control information in an HDLC (high-level data link control) packet structure and provide the packet in serial form to the RF transceiver 54. For more information on the HDLC packet structure, see for example, Mischa Schwartz, Telecommunication Networks: Protocols, Modeling and Analysis, Addison-Wesley (1988). When a packet is received through the RF transceiver 54, the serial channels check the packet destination address, check for errors, and deserialize the packet to data storage 68. The serial channels must have the capability to recognize a specific adaptor address as well as a broadcast address. Specific microprocessors with appropriate serial channel and timer facilities include the Motorola 68302 and the National HPC46400E microprocessors. The computer 50 runs an operating system 70 which supports one or more user application programs 72. Operating system 70 may include a communications manager 74, or the communications manager 74 may itself be an application program installed on the computer. In either case, the communications manager 74 controls a device driver 76 via the operating system 70. The device driver 76, in turn, communicates with the transceiver adapter 36 or 44 via bus interface 52.

Figure 3:
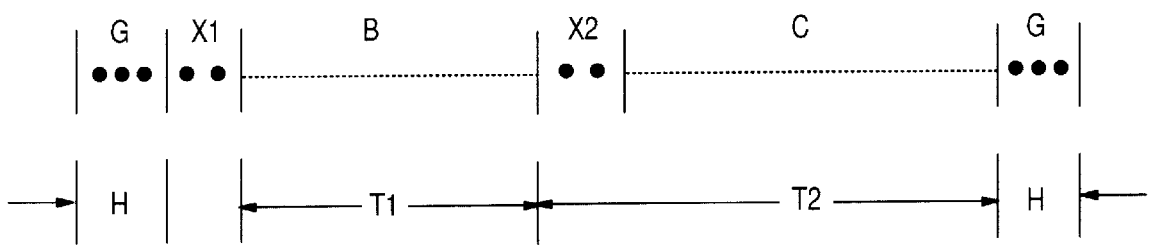
FIG. 3 is a data framing diagram showing one medium access central protocol which may be implemented in a preferred embodiment of the invention.

FIG. 3 shows one protocol which may be used in the preferred embodiment of the invention. It is to be appreciated that other protocols may be utilized in the practice of the invention. While the protocol is equally applicable to radio frequency (RF), infrared (IR), or wired transmission systems with broadcast capability, and to either conventional or spread-spectrum modulation techniques, slow-frequency hopped spread spectrum radio systems have a natural affinity for the protocol since those systems share a structure to time with the protocol. With reference to FIG. 3, there are five intervals defining a "hop". The first (and last) interval, G, is the interval during which the transmitter carrier frequency is changing. Note that the G interval is needed only for frequency hopping systems. The interval, X1, is the interval during which the base station broadcasts a special message to all the remote stations identifying the beginning of the following, or B, interval. The B interval is the interval during which, by convention, only the base station may initiate transmission and remote stations may respond only when required by the message protocol. For example, the remote station may acknowledge a message outbound from the base or may respond when polled. The B interval has a duration T1. The B interval is followed, in turn, by the X2 interval which is the interval during which the base station broadcasts a special message to all the remote stations identifying the end of the B interval and, by implication, the beginning of the C interval. The message also conveys the length of the C interval and, optionally, the length of the B interval as well. The X2 broadcast message is not strictly necessary. Information about the entire hop structure can be conveyed in the X1 interval. The X2 message is included to support operation of simplified remote stations capable of only contention-mode operation. These stations wait for the X2 message and contend subsequently. The C interval is the interval during which any station, including (or optionally excluding) the base station, may contend for the channel and transmit a message without the consent of the base station. For example, a CSMA/CA (carrier sense multiple access with collision avoidance) protocol may be used in this interval. The C interval duration is T2. If a remote station sends a message and receives an acknowledgement, it can assume the message has been received correctly. If not, it will contend again. There is a guard interval at the end of the C interval during which a remote station with a particular message may not transmit. If Tmsg is the time to transmit a particular message and Tack is the time to transmit an acknowledgement and Turnaround is the time between the end of a transmission of a message and the initiation of the transmission of an acknowledgement, then the guard interval is Tmsg+Tack+Turnaround. Note that because Tmsg is a function of the length of the message to be transmitted, the guard interval may be different for different remote stations having a message to send. The guard interval is not wasted; rather, messages and acknowledgements are sent and received right up to the end of the C interval.

By varying the time T2, the base station can expand or contract the contention interval. If the system is very lightly loaded and most of the traffic is inbound to the base station, it is advantageous to remote response time to lengthen the time period T2. Conversely, if the system is heavily loaded and most of the traffic is outbound, the time period T2 should be minimized. The time period T2 should not be reduced to zero, however, as it is the only mechanism by which a newly activated remote station can register itself to the base station.

Figure 3A:
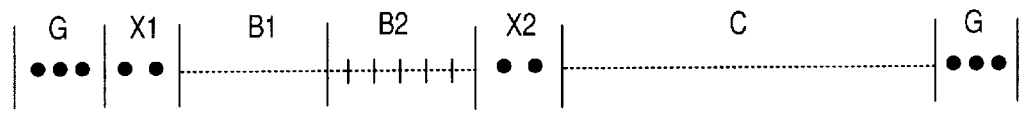
FIG. 3A is a data framing diagram showing a modification of the basic protocol illustrated in FIG. 3.

Additionally, a further subdivision of the B interval, in which remote-to-base traffic is carried in allocated times lots, may be made as shown in FIG. 3A. In FIG. 3A, the B interval is subdivided into B1 and B2 subintervals, and the B2 subinterval is, in turn, subdivided into a plurality of time slots, each time slot being allocated to a specific remote station. Requests for an allocated slot may be made by a remote station in response to a poll during the B1 subinterval, or the requests may be made during the C interval. Once confirmed by a message from the base station, slot allocation guarantees that the remote station can transmit to the base station during its allocated time slot.

By varying the boundary between the B2 subinterval and the C interval, the suitability of the system to different types of traffic can be adjusted. As the traffic load for steady, predictable traffic (e.g., real-time audio and video) increases, the boundary can be moved to lengthen the B2 subinterval and shorten the C interval, thereby increasing the number of allocatable time slots. Conversely, as the traffic becomes less predictable, the boundary can be moved to lengthen the C interval, providing greater bandwidth for contention-based traffic.

From FIG. 3, it will be appreciated that the "hop" is divided into two subdivisions, one of which supports a controlled access scheme and the other of which supports a random access scheme. The invention may operate in any one of three modes: one in which only the X1 message is sent, one in which only the X2 message is sent, and one in which both are sent. In the case where only the X1 message is sent, the X1 message constitutes the header section of a frame. It identifies the start of the information frame, carries a unique identification of the base station, identifies the frequency hopping pattern, and defines the length of the B and C intervals. Optionally the X1 message also carries general broadcasting and system control information.

In operation, each remote station waits for the X1 message. When received, a remote station sets an internal timer for T1 and for T1+T2 so that it knows when the contention interval begins and when to schedule its next frequency change. Broadcast reception of messages is not guaranteed, only likely. Radio conditions may be such that a particular remote station does not hear the broadcast message X1. Because a remote station cannot transmit autonomously without first hearing the X1 message and letting T1 elapse, it will remain quiet for the entire frame. Alternatively, if the remote station is polled by the base station during interval B, it may respond, but in no case can it contend in the C interval. It must remember T1+T2 from the last frame so that it knows when to hop, and it will listen in the next frame for the X1 message. If no X1 message is heard for a number of consecutive frames, the remote station must assume that it has lost hop synchronization with the rest of the system and enter a synchronization acquisition mode.

Each frame time period of length T=T1+T2 can also be a frequency hopping period for implementation under FCC regulation part 15. A fixed length of time T is recommended but not necessary. A fixed length of time T is especially useful in the following cases:

1) When several frequency hopping patterns are used in overlapped operation in a multicell radio system, a fixed length of time T makes interference separation much more feasible. In this case, the frequency hopping pattern information in the header section can be used to identify the hopping sequence for a remote terminal to follow.
2) If all radios in a system are hopping with the same pattern, a fixed length of time T permits different cells to hop in synchronism but at different phases of the hopping pattern. This eliminates interference between cells.

A tradeoff needs to be made in selecting the length of time T. A large time T makes the system overhead smaller, and a small time T makes the system response time smaller. Instead of the X1 message, the system can transmit the X2 message only. The content of the X2 message can be similar to that of the X1 message except that remote stations receiving the X2 message can immediately begin contention. This may be an advantage in some applications. For the case of transmitting the X2 message only, suppose the base station polls a remote station near the end of the B interval, and the remote station responds with a lengthy message. Generally, the protocol must prohibit these responses from being too lengthy. It may be that the response is active even as the period T1 expires. With only X1 messages, this may be a problem, but with X2 messages, the base station can then originate the X2 message as soon as the response is complete, making sure to include a shortened T2 period in the X2 message. The effect will be to diminish the contention interval for one hop's duration. In the third mode of operation, both X1 and X2 messages can be used to simplify the implementation of the remote station and to provide redundancy. The X1 message would then signal the beginning of the B interval, and the X2 message would signal the beginning of the C interval.

FREQUENCY MANAGEMENT

This embodiment of the invention relates to methods and techniques for interference control in wireless LANs based on Slow Frequency Hopping Spread Spectrum communication. Specifically, interference control includes methods for accomplishing the following key steps in such a system.

1. FH Pattern Acquisition
2. FH Pattern Monitoring before Hopping
3. FH Pattern Revision Interference between adjacent cells in the system must be minimized, and preferably avoided altogether, by suitable FH pattern generation and assignment methods. In a multi-cell wireless LAN communications system, wireless cells are grouped into logical LANs, each logical LAN being controlled by a Wireless Network Controller 18 in FIG. 1A (WNC). The FH component of the Wireless Network Controller performs FH pattern management and control functions in a Logical LAN, for that purpose it is in communication with a wireless control agent (WCA) located in each base station. Each distinct Logical LAN is considered an autonomous network and carries a unique network identifier (NETWORK-ID). Two autonomous networks are distinct and independent entities that do not explicitly coordinate with each other. Two Logical LAN's or networks are collocated if radio coverage of one or more of the cells of one logical LAN can interfere with one or more of the cells of the other logical LAN. In this embodiment of the invention, each logical LAN includes a WNC and one or more Wireless Control Agents (WCA). Where the WNC and WCAs are physically situated, is a function of the type of the system.

Figure 4:
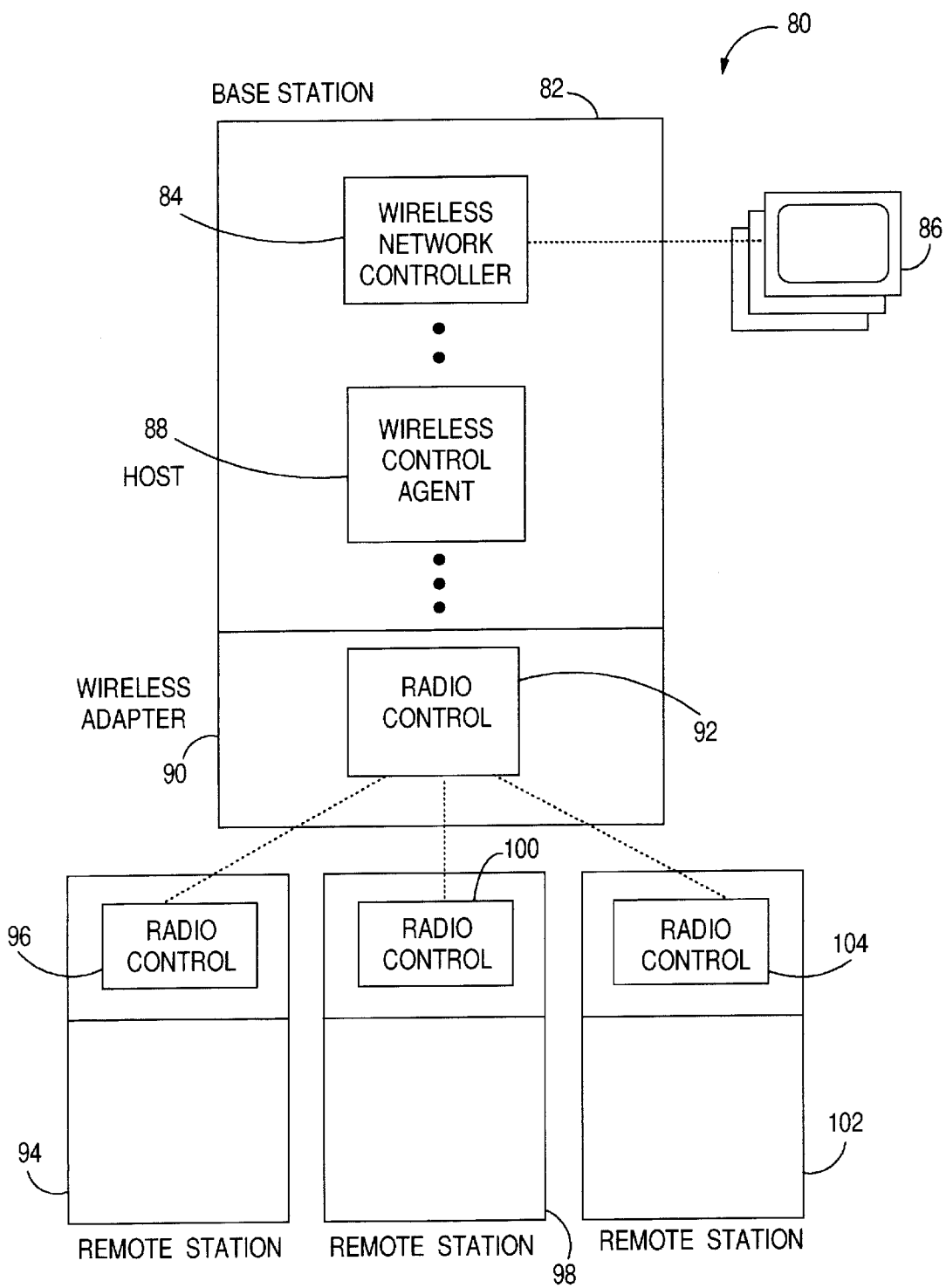
FIG. 4 is a block diagram of a single cell wireless LAN system showing a possible option for wireless network controller and wireless control agent functions placement.

In a single cell wireless LAN system 80, such as shown in FIG. 4, a base station 82 includes both a WNC 84 and a WCA 88. The WNC is connected to a monitor 86 and the WCA 88. The WNC 84 and WCA 88 are together responsible for the distribution and maintenance of hopping patterns. The WNC 84 is a centralized managing station operating in a specified station, in this instance, base station 82. The WCA 88 is located in every base station in a logical LAN. In this instance since there is only one base station 82, it is in the same station as the WNC 84. As discussed below, this is not so in a multiple cell network. The WCA 88 is connected to a wireless adapter 90, which includes a radio control transceiver 92 for communicating with a plurality of remote stations. A remote station 94 includes a radio control transceiver 96 for communicating with radio control transceiver 92 in the wireless adapter 90 of base station 82. Remote stations 98 and 102 communicate in a like manner via radio control transceivers 100 and 104, respectively.

Figure 5:
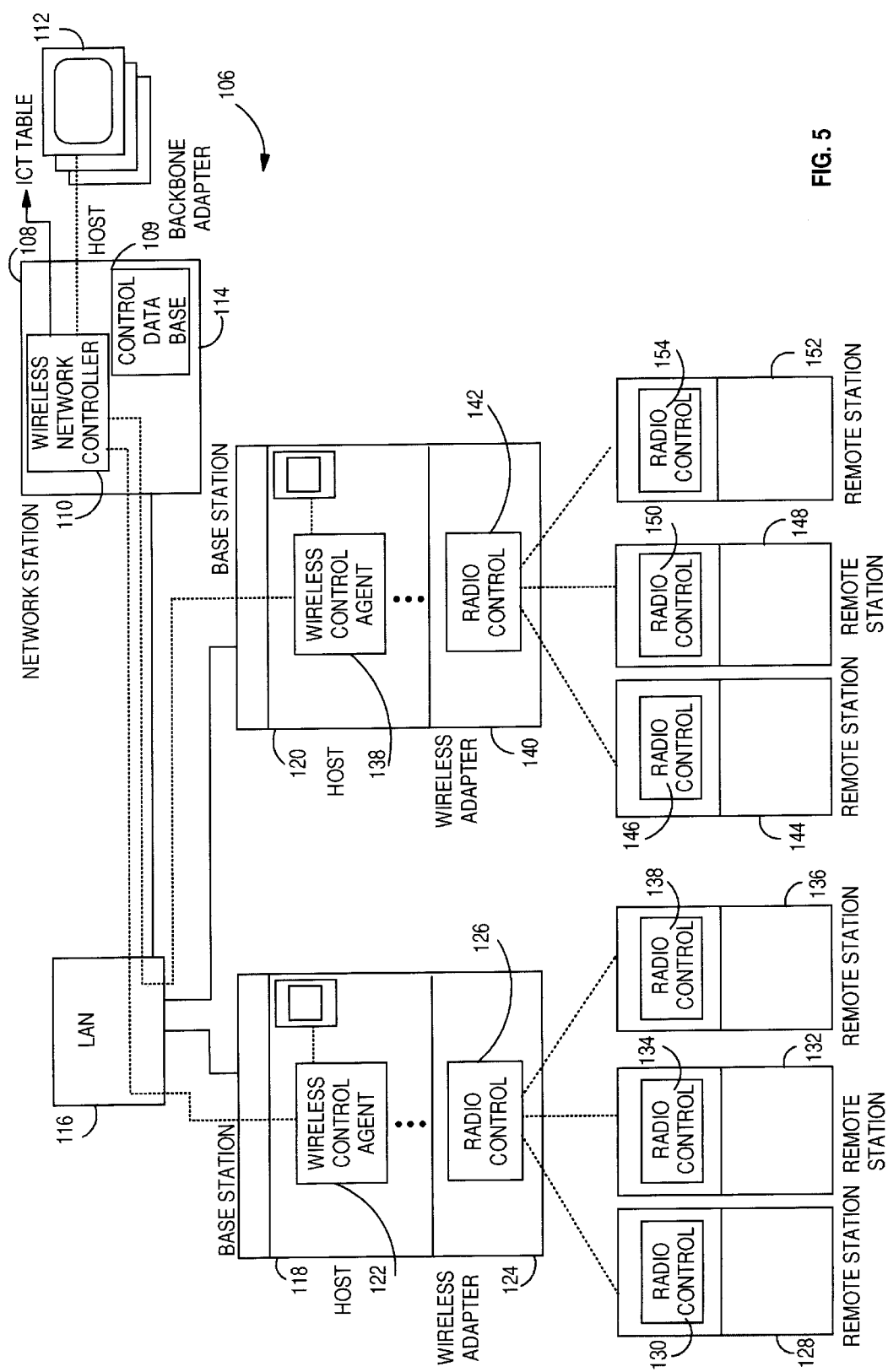
FIG. 5 is a block diagram of a multiple cell wireless LAN system in which the wireless network controller and wireless control agents are located in different physical units.

FIG. 5 illustrates a multiple cell network 106 in which the WNC and WCA are in different physical units. In this instance, the WNC is a centralized managing entity operating in a specific station. The WNC may be in any terminal or station on a backbone LAN, whether it is a base station or not. For multi-segment LANs, there is a unique WNC for the whole network. This is true even for heterogeneous LANs including for instance token-ring and Ethernet segments as long as the network identifier is unique. The WCA is located in each base station linked to a backbone LAN, and acts as a representative of the WNC. The WCA functions as a cell controller and is responsible for opening the base station adapter for communication. As previously stated, the WNC and the WCA are responsible for the distribution and maintenance of the hopping patterns. The multiple cell network 106 of FIG. 5 includes a network station 108 which includes the WNC 110 which communicates with a monitor 112 and a backbone adapter 114 which is connected to a backbone LAN 116. The WNC 110 has access to a network control database 109 comprising network topology and frequency management information. It is seen that the network station 108 does not include a WCA. A plurality of base stations, each of which includes a WCA, is connected to the LAN 116. For example, base stations 118 and 120 are connected to the LAN 116. When two base stations have overlapping geographical coverage areas they are called neighbors. This means that in these overlap areas, a given remote station can receive signal from both neighbor base stations. Base station 118 includes a WCA 122 which communicates with the WNC 110 of network station 108 via LAN 116, and with wireless adapter 124 which includes a radio control transceiver 126. The transceiver 126 communicates with a plurality of remote stations 128, 132 and 136 which include radio control transceivers 130, 134 and 138, respectively. Base station 120 includes a WCA 138 which communicates with the WNC 110 of network station 108 via LAN 116, and with wireless adapter 140 which includes a radio control transceiver 142. The transceiver 142 communicates with a plurality of remote stations 144, 148 and 152 which include radio control transceivers 146, 150 and 154, respectively.

How FH pattern acquisition; monitoring before hopping; and pattern revision is accomplished in a given logical network such as those set forth in FIGS. 4 and 5 is set forth below.

Figure 6:
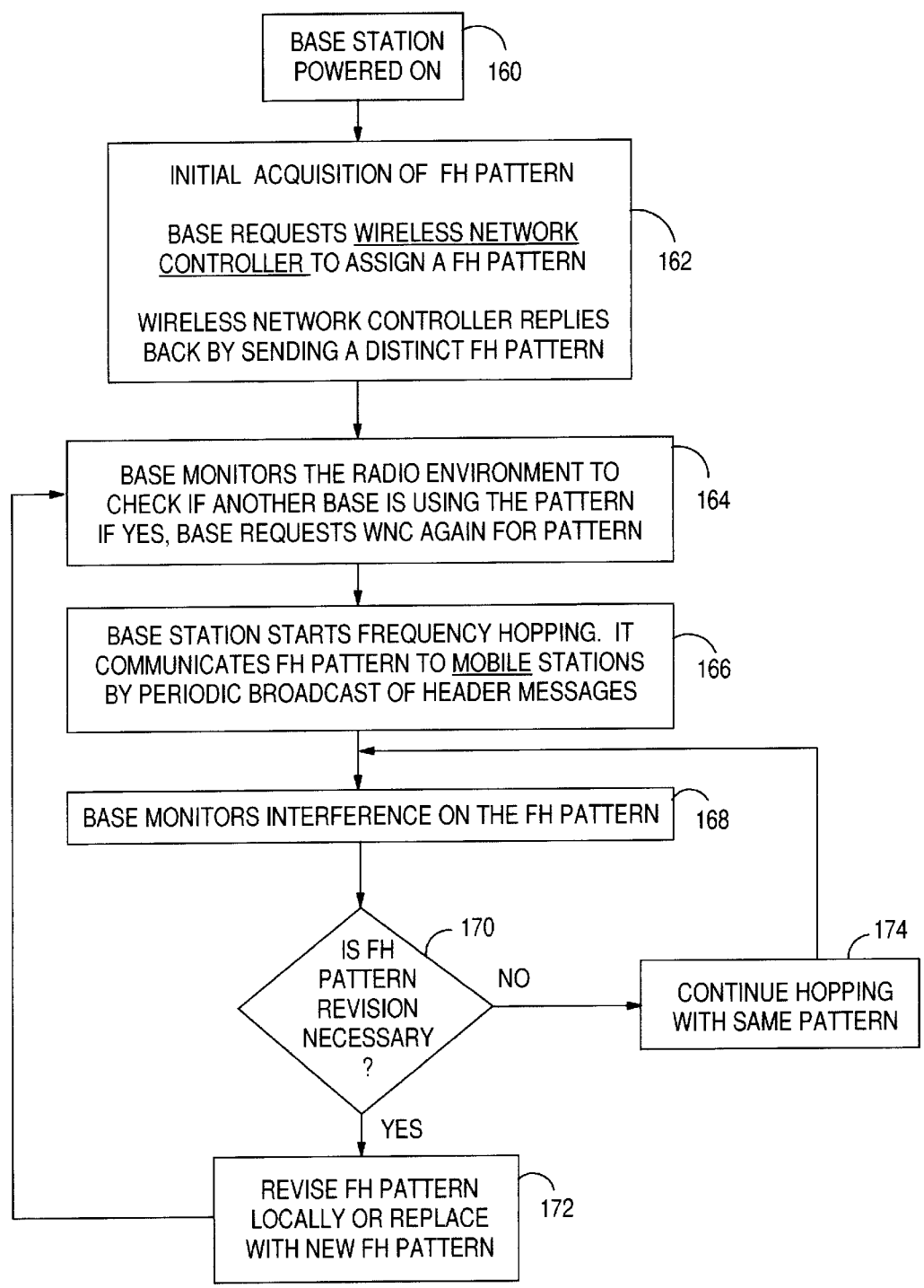
FIG. 6 is a flow chart providing an overview of frequency hopping patterns management in a multiple cell wireless LAN system.

FIG. 6 is a flow chart which provides an overview of Frequency Hopping operation in a single Logical LAN. When a base station is powered on at block 160 it must first acquire a FH pattern to use in the cell as shown at block 162. This is accomplished by sending a request and then receiving a FH pattern in response from the Wireless Network Controller. The base monitors its radio environment at block 164 to ensure that no other base within its radio vicinity is using the same FH pattern. Then it starts frequency hopping at block 166. It also communicates the FH pattern to remote stations within its range. Remote stations perform monitoring of interference on the hops in a FH pattern. The base station monitors interference on the FH pattern at block 168. At block 170, it is determined if FH pattern revision is necessary. If revision is necessary as determined at block 172, a return is made to block 164. If revision is not necessary, hopping is continued with the same pattern at block 174, and a return is made to block 168. Details of the various steps are described below.

Only frequency-hopping pattern management within a single Logical LAN is considered. The base stations in a Logical LAN operate in an "unsynchronized" manner. Each base station follows a cyclic frequency hopping pattern. One period of this cyclic hopping pattern structure is called a "superframe". Superframes of adjacent base stations satisfy the following conditions.

1. All the hops within a superframe have the same length.
2. All the base stations have the same number of hops within a superframe.
3. Superframes of adjacent base stations are not synchronized.

Figure 7:
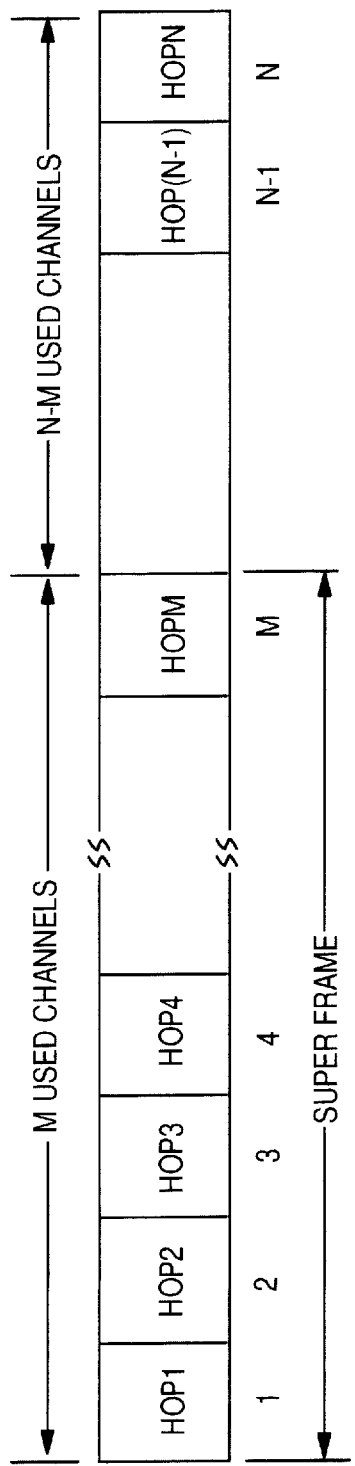
FIG. 7 is an illustration of a superframe structure used in a frequency hopping wireless LAN system.

FIG. 7 illustrates a superframe comprised of M Hops. There are M used hops at any given time, and N-M unused hops, where M is an integer which is less than the total number of available hopping frequencies N (M<N). How a hopping pattern is acquired by a base station is explained below.

Figure 8:
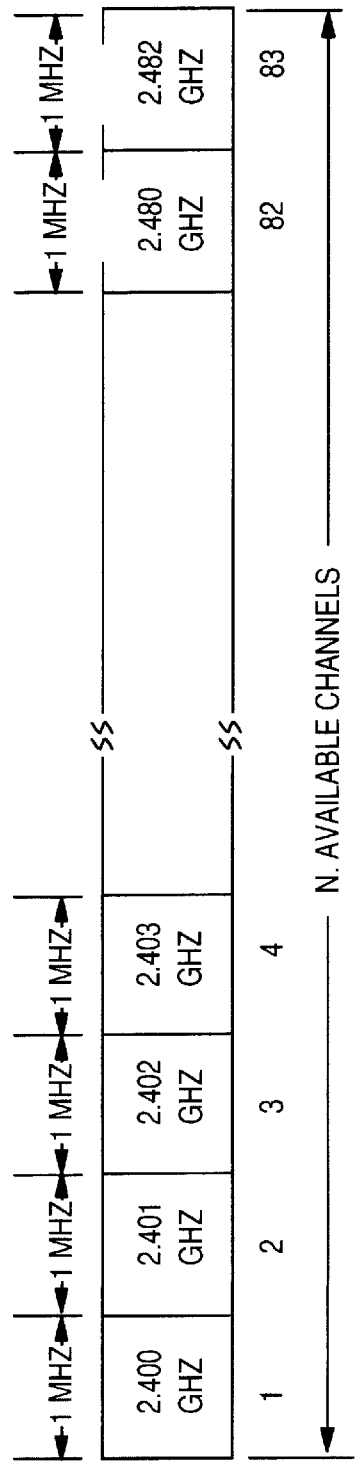
FIG. 8 is a set of radio frequency channels from which frequency hopping patterns can be selected.

FIG. 8 illustrates an example of a frequency band (83 MHZ wide) divided into 83 available channels each 1 MHZ wide. A subset of the channels can be chosen to form a FH pattern. Each hop is one megahertz (1 MHZ) wide, and the frequencies entered from 2.400 gigahertz (GHZ) to 2.482 (GHZ). It is to be appreciated that a different frequency band may be utilized in the practice of the invention. In practice, different countries have different rules governing the frequency bands that may be utilized. As is known in the art, data is modulated on the carrier frequencies (hopping frequencies) for transmission between base stations and remote stations.

FREQUENCY HOPPING PATTERN ACQUISITION

The overall logic for Frequency-Hopping operation in a logical LAN was described relative to FIG. 6. An outline of the acquisition of FH patterns by a base station is as follows.

Figure 9:
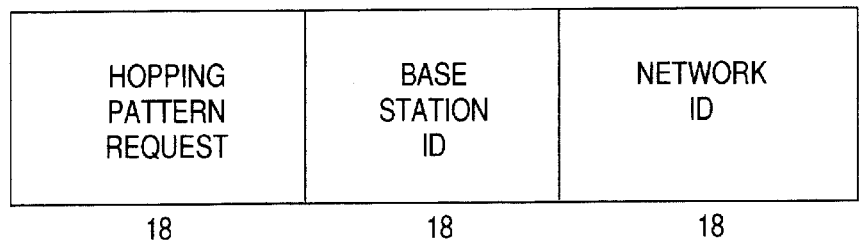
FIG. 9 shows the general structure of a frequency hopping pattern request packet.

Consider a Logical LAN with multiple base stations. When a requesting base station is powered on, it sends a Hopping Pattern Request (HPR) packet to the Wireless Network Controller. FIG. 9 shows the structure of a HPR packet the first field carries a predetermined code indicating that it is a frequency hopping pattern request, the next field carries the identifier assigned to the base station requesting a FH pattern and the last field carries the identifier of the logical network the requesting base station wants to register in.

Figure 11:
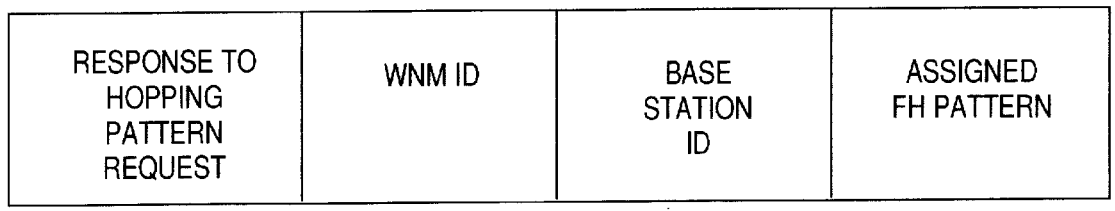
FIG. 11 shows the general structure of the response packet to a frequency hopping pattern request.
Figure 10:
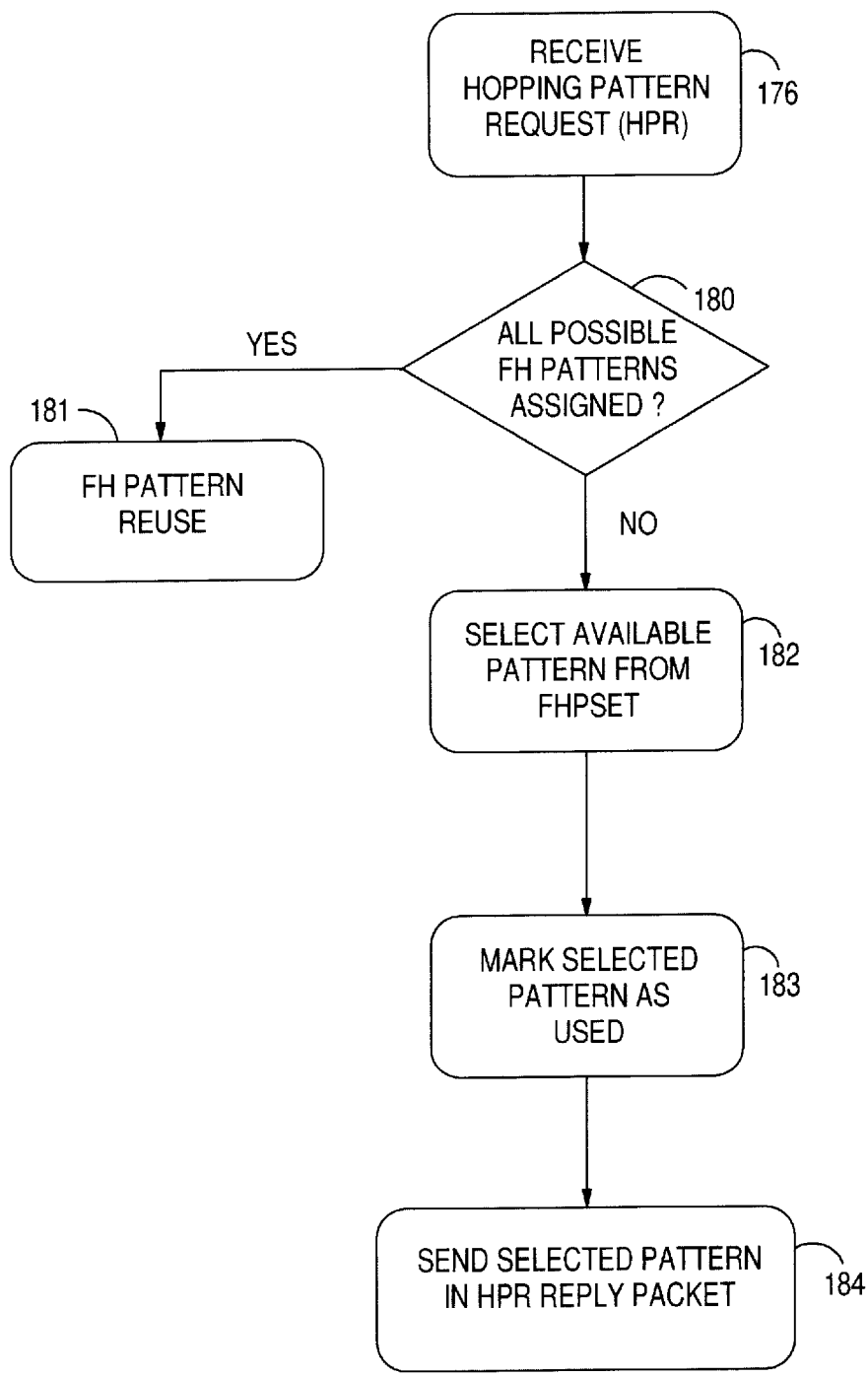
FIG. 10 is a flow chart of the process performed by the wireless network controller to assign a frequency hopping pattern to a base station.

According to the present invention, on receipt of a Hopping Pattern Request packet, the Wireless Network Controller executes the following steps as shown in FIG. 10. A determination is made at block 180 if all FH patterns from the set of possible patterns have already been assigned to active base stations belonging to the same logical network as the requesting base station. If so the process jumps to block 181 to reuse a FH pattern according to a method further explained below in relation with FIG. 13. If not, the process randomly selects a FH pattern from the set (FHPSET) of patterns at block 182 among those which have not been assigned. The Wireless Network Controller keeps track of FH patterns that are being used by the base stations belonging to the logical network it controls as shown in block 183. At block 184 the process communicates to the base station the resulting FH pattern. This communication occurs via the backbone communication network. The FH pattern information is contained in response to a hopping pattern request (HPR) message as shown in FIG. 11, the first field carries a predetermined code indicating that it is response to a hopping pattern request, the next field carries the identifier of the Wireless Network Manager answering the hopping pattern request and the last field carries the FH pattern assigned to the requesting base station. On receipt of the message, the requesting base station immediately starts hopping with its newly assigned FH pattern. The same steps (176 to 184, FIG. 10) are performed upon request from a base station which detects that another base is using the same FH pattern as shown in step 164 FIG. 6.

FREQUENCY HOPPING PATTERN REUSE

Referring now to block 181, it is performed by the Wireless Network Controller when all existing patterns have already been assigned to active base stations belonging to the same logical network as the requesting base station. One object of the invention is to provide a method for reusing frequency hopping patterns when all possible patterns have already been assigned to active base stations as will be describe in detail in reference to FIG. 13. Such a method involves information gathered by the Wireless Network Controller 110 (FIG. 5) in the centralized network control data base 109 whose structure is going to be described hereafter.

Figure 12:
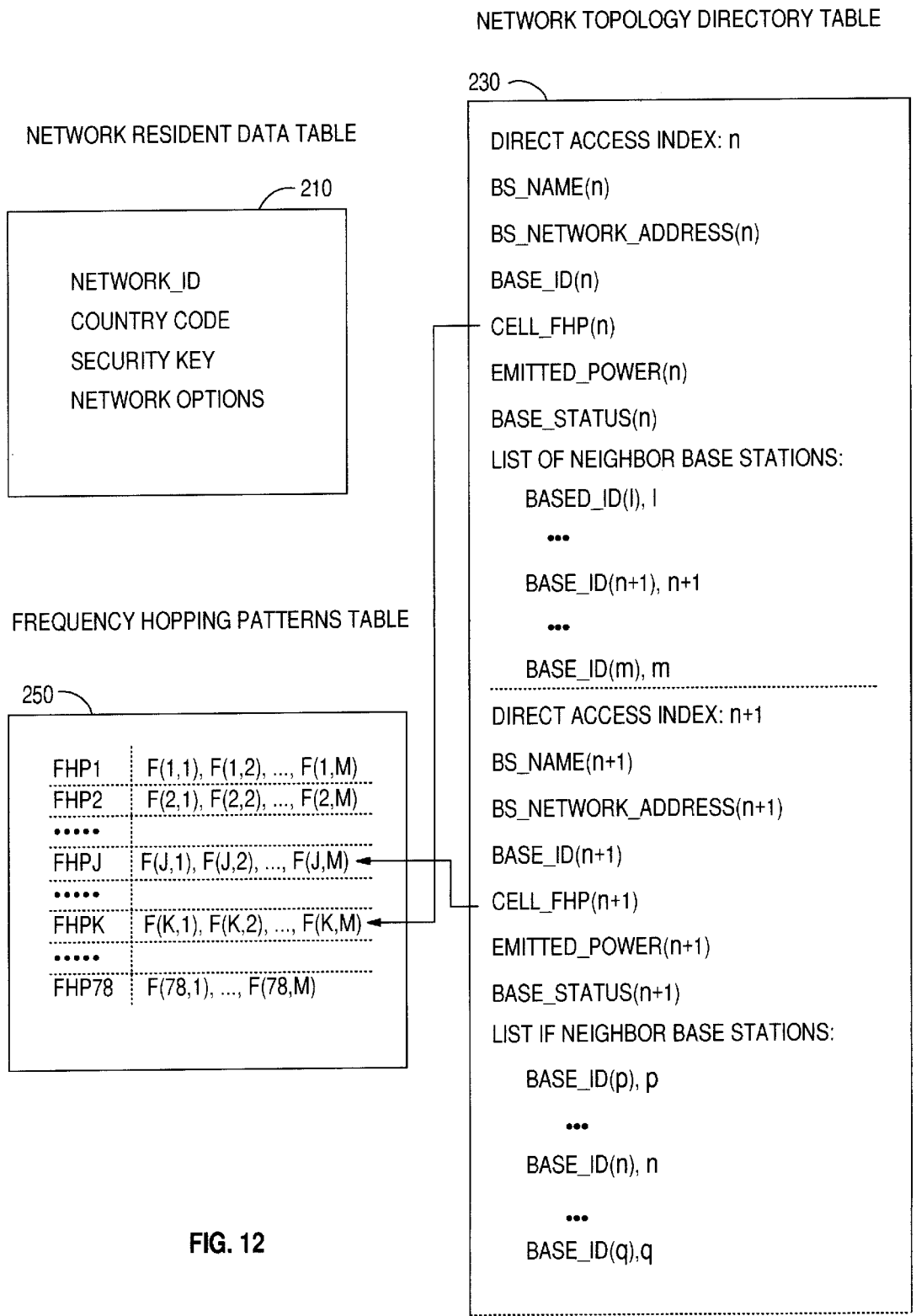
FIG. 12 shows the contents and the structure of the wireless network control database used by the wireless network controller.

Referring now to FIG. 12 it shows the contents and structure of the wireless LAN control database 109 (FIG. 5) used in this embodiment of the invention. The network resident data table 210 (FIG. 12) holds the network attributes common to all the stations of a given logical LAN. The NETWORK_ID parameter identifies a given logical wireless LAN among other collocated logical LANs.

The country code identifies the nation in which the system operates and is necessary to conform with the regulations set in each country to control the operation of mobile systems and more particularly RF systems. Some kind of security key information is also necessary to prevent that unauthorized users may join the network or monitor the data traffic. Other network options such as access control type also has to be stored in the network resident data table and shared with all the stations.

Frequency management information is provided in the frequency hopping patterns table 250. The frequency hopping patterns table 250 lists all the frequency hopping patterns available in the country where the system operates. In the example provided in FIG. 12 there are 78 patterns (FHP1 to FHP78) each pattern consisting in a unique sequence of the M used frequencies of FIG. 7 (HOP1 . . . HOPM). For instance frequency hopping pattern FHPk consists in the sequence of M frequencies f(k,1) . . . f(k,M) which is a unique sequence of the M used frequencies HOP1 . . . HOPM. Each entry in the frequency hopping patterns table comprises a first field carrying frequency hopping patterns identifiers (FHP1 to FHP78) followed by the sequence of M frequencies constituting the frequency hopping pattern, for instance f(k,1) to f(k,M) is the sequence corresponding to FHPk. Each entry also comprise an additional field (not shown in FIG. 12) indicating whether the corresponding FH pattern is assigned to an active base station, this information is used by the network controller when looking for a free FH pattern at step 10 of FIG. 10.

These patterns are not static, they are updated each time a new interference situation is faced and the new information is automatically provided to all the active base stations of the logical wireless LAN network. If single frequency channels are used, the frequency management information would consist in a list of frequencies. If direct sequence spread spectrum is used the frequency management information contains the list of all available chip codes.

The network topology directory table 230 lists all the base stations which form the logical LAN and carries a list of parameters assigned to each base station. It also keeps track of information representative of the radio topology of the wireless LAN system and more specifically it holds a list of direct neighbor base stations for each base station belonging to the logical wireless LAN. There is one entry for each base station defined in the logical wireless LAN system, each entry comprises:

n: table direct access index.

BS_NAME(n): the base station name, typically a unique string of characters.

BS_NETWORK_ADDRESS(n): the base station network address, which is used to establish the connection between the base station and the wireless network station 108 over the LAN backbone, 116 in FIG. 5.

BASE_ID(n): identifier assigned by the wireless network controller to the base station, it is used by the remote stations to identify the different base stations.

CELL_FHP(n): frequency hopping pattern used by the base station.

EMITTED_POWER(n): base station emitted power, provided at network setup time by the operator and adjusted subsequently according to traffic load.

BASE_STATUS(n): indicates whether the base is active or inactive.

BASE-ID(l), l: list of base stations which are direct neighbors of BASE_ID(n) comprising their identifiers BASE_ID(l) along with the direct access index l pointing to the corresponding entry in the network topology directory.

In the example shown in FIG. 12 it is assumed that the frequency hopping pattern CELL_FHP(n) assigned to the base station BASE_ID(n) is FHPk and similarly FHPj is used by BASE_ID(n+1). In order to be allowed to register in a given logical wireless LAN system, a base station must be defined in the network topology directory 230 with its network address on the LAN backbone. This is defined by the network operator at network set-up time. At network set-up time, the network operator also provides for each base station the list of other neighboring base stations, based on the physical set-up of the system and taking into account interference measurements performed as part of the network planning and installation procedure. Defining a new base adds an entry in the network topology directory. At start-up time the base station requests its operating parameters from the wireless network controller 110 through the LAN backbone 116. The operating parameters include the network identifier (NETWORK_ID), the country code, the network options, the base station identifier (BASE_ID), the frequency hopping pattern assigned to the base station (CELL_FHP) and the base station emitted power. The network identifier, the country code, the network options and the base station emitted power are those provided at network set-up time by the operator. The base station identifier and the frequency hopping pattern may be assigned in different manners. A first approach is to simply keep track of the base station identifiers and frequency hopping patterns that have been already assigned and to select randomly among those which are still available. Such a method limits the number of base stations in a given wireless LAN system to the maximum number of base station identifiers or to the maximum number of frequency hopping patterns available in the country where the system operates.

In the system carrying out this embodiment of the invention the maximum number of base stations identifiers is 64 and the maximum number of frequency hopping patterns vary from around 60 to 80 depending on the various country regulations. One object of this invention is to overcome these limits by reusing already assigned frequency hopping patterns. The method of the invention uses information about neighboring stations from the network topology database to derive an indication of radio cell distance between the various base stations as described in detail below.

Figure 13:
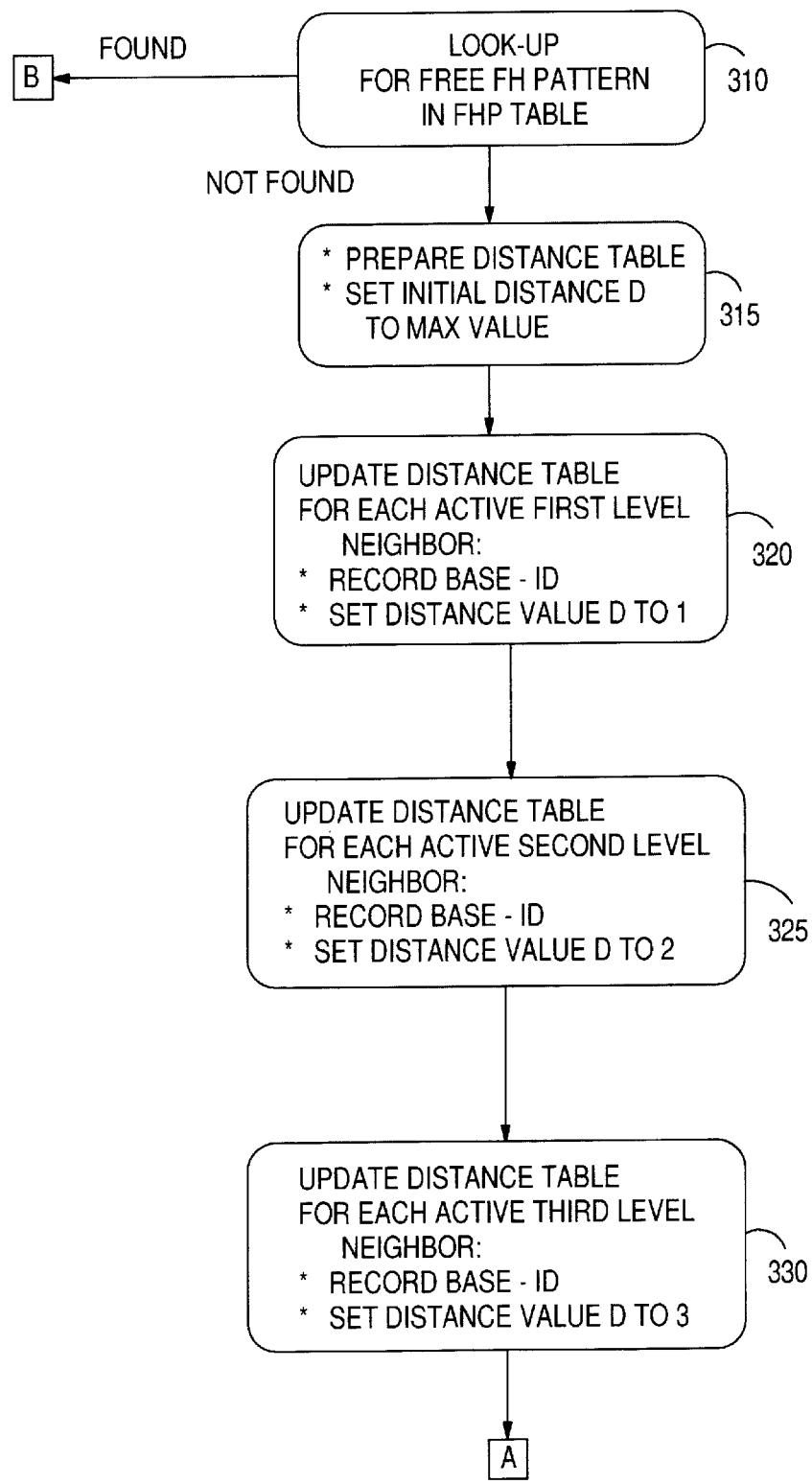
FIGS. 13 and 13A are flow diagrams of the process performed by the wireless network controller to reuse already assigned frequency hopping patterns.

Referring now to FIG. 13, it shows a flow diagram of the method used for reusing frequency hopping patterns. In step 310 the wireless network controller looks-up in the frequency hopping patterns table 250 for a free FH pattern. If it finds one the process jumps directly to step 360 FIG. 13A as shown by connector B and the available FH pattern is returned to the requesting base station. If all FH patterns have already been assigned the process prepares at step 315 a distance table with a first column consisting in the list of all existing FH patterns identifiers (FHP1 to FHP78), a second column for storing the identifier of the base station using the FH pattern of the first column and a third column for storing an integer value D representative of the distance between the requesting base station and the base station of the second column. The initial value of D is set to a maximum value MAX for all entries of the distance table.

At step 320 the process looks up in the network topology table 230 for the entry corresponding to the requesting base station identified by its BASE_ID. Based on the list of neighbor base stations and the direct access index of the corresponding entry in the network topology table the process retrieves the assigned FH pattern and the status of each neighbor base station. For those neighbor base stations whose status is active, the process updates the entry in the distance table corresponding to their assigned FH with the neighbor base station identifier BASE_ID and sets the value D of the corresponding distance to 1. As a result of step 320, all the direct neighbors of the requesting base station are included in the distance table and the value of the distance D between the requesting base station and its direct neighbors is set to 1.

Step 325 is similar to step 320, the process updates distance table entries corresponding to FH patterns assigned to those second level neighbors whose status is active. Second level neighbors are direct neighbors of the requesting base station's direct neighbors. Each entry carries the FH pattern assigned to the corresponding second level neighbor and the second level neighbor base station identifier. For these entries, the value of the distance D is set to 2. It should be noted that a second level neighbor may have already been identified as a direct neighbor, in such a case it is not processed as a second level neighbor and the value of the distance D is kept to 1.

The same processing as step 325 is repeated in step 330 for third level neighbors, i.e. direct neighbors of second level neighbors. As a result of step 330, the distance table entries corresponding to the direct, second level and third level neighbors FH patterns carry the neighbor base stations identifiers and the value of the distance D has been set respectively to 1, 2 and 3 for those table entries. Assuming that a frequency hopping pattern has been requested by the base station BASE_ID(m) and using the tables of FIG. 12, the distance table will, as a result of step 330, look as follows:

TABLE 1

| FH pattern identifier | Base station identifier | Distance value D |
|---|---|---|
| FHP1 | | MAX |
| ... | ... | ... |
| FHPk | BASE_ID(n) | 1 |
| ... | ... | ... |
| FHPj | BASE$_{ID}$(n + 1) | 2 |
| ... | ... | ... |
| FHPi | BASE-ID(q) | 3 |
| ... | ... | ... |
| FHP78 | BASE_ID(p) | 3 |

This table assumes that BASE_ID(n) is a direct neighbor of BASE_ID(m) therefore the entry corresponding to its FH pattern FHPk is assigned a distance value D of 1. BASE_ID(n+1) is a direct neighbor of BASE_ID(n) and a second level neighbor of BASE_ID(m), the entry corresponding to its FH pattern FHPj is assigned a distance value D of 2. BASE_ID(p) and BASE_ID(q) are direct neighbors of BASE_ID(n+1) and third level neighbors of BASE_ID(m), the entries corresponding their FH patterns (supposedly FHPi and FHP78) are assigned a distance value of 3. This table assumes that FHP1 is not assigned to any direct, second or third level neighbor of BASE_ID(m), therefore the corresponding distance value D is kept to MAX.

Figure 13A:
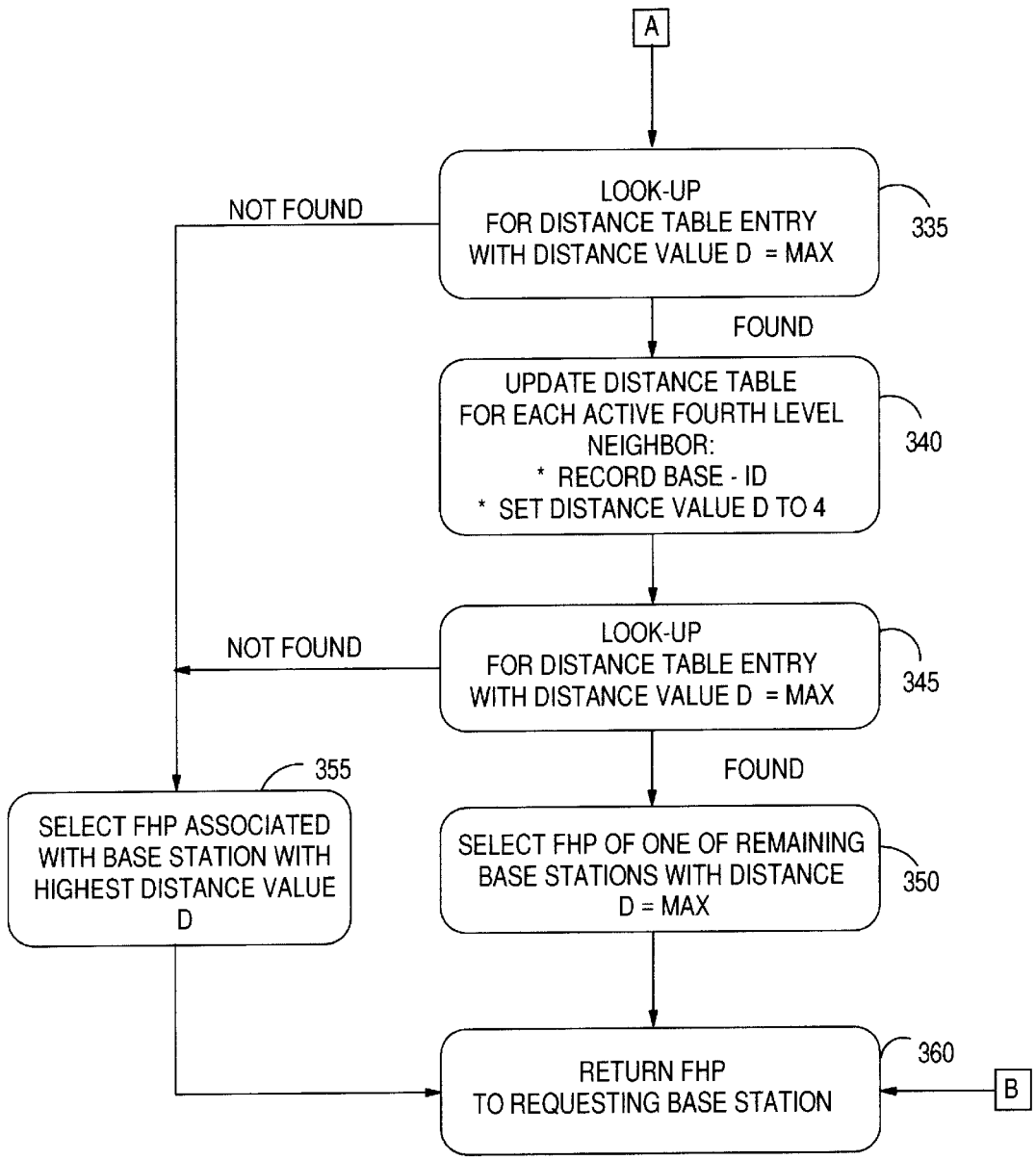

The process goes on with step 335 in FIG. 13A as shown by connector A. The process looks up in the distance table for an entry whose distance value D is MAX which means that the corresponding FH pattern is not used by either a direct, a second level or a third level neighbor. If there are such entries, the process goes on with step 340 similar to step 325, to include 4th level neighbors in the distance table and set their distance D to 4. If all FH patterns have been assigned a distance value D of either 1, 2 or 3, the process selects in step 355 one of the FH patterns with a distance D of 3 and returns it to the requesting base station in step 360. In step 345 the process looks up again in the distance table for an entry with a distance D of MAX. If there are remaining FH patterns with a distance of MAX the process selects one of them in step 350 and returns it to the requesting base station in step 360. If all FH patterns have been assigned a distance value D of 4 or less the process selects in step 355 one of the FH patterns with a distance D of 4 and returns it to the requesting base in step 360. It should be noted that the method described in the flow diagram of FIGS. 13 and 13A are merely illustrative of the invention. The man skilled in the art can easily adapt this method to fit particular performance requirements or interference situations. One alternative is for instance to perform the processing of steps 325, 330 and 340 for 5th level neighbors and above until all direct and indirect neighbors are found and to select either one of the remaining FH patterns with a distance of MAX or, if no such remaining FH pattern is left, one of the FH patterns with the greatest distance value D.

INTERCELL INTERFERENCE LEARNING

The topology information provided by the network operator at network set-up time about neighboring relationships between base stations is subject to change through time. Such changes may come from various reasons: base stations may be physically moved, their emitted power may be modified thus changing the size of the wireless LAN cells, or radio frequency propagation conditions may change due for instance to modifications made to the building where the wireless LAN is installed. One aspect of the invention is to provide a method for dynamically updating base stations neighboring relationships information. Information about cells overlaps is gathered by remote stations when they register with a given logical LAN and is sent to the corresponding WNC for update of the network topology table. In the system used in the preferred embodiment of the invention there is no synchronization between the base stations of a given logical LAN. Each base simply maintains a fixed length superframe structure and operates independently of other bases. In the preferred embodiment a superframe consists of 75 frequency hops, each hop corresponding to a 50 milliseconds frame. As a result a superframe lasts for 3.75 seconds. At the beginning of each frame each base station sends the X1 message. The X1 message constitutes the header section of a frame, it identifies the start of the information frame, it carries a unique identification of the base station comprising the base station identifier BASE__ID and the logical LAN identifier NETWORK__ID. When a remote station is powered on it does not know who are the surrounding base stations and which frequency hopping patterns they use. It only knows the frame and superframe durations and the set of all possible frequencies used by the base stations. To register with a target logical LAN, the remote station starts by randomly selecting a frequency and listening for X1 messages from neighboring base stations. After a fixed period of time, it switches to another frequency and keeps listening for X1 messages. Upon receipt of a X1 message carrying the NETWORK__ID of the target logical LAN, the remote station records in a base station selection table, the identifier of the emitting base station BASE__ID, its HDLC address and an indicator representing the strength of the signal received from the emitting base station. A number of frequencies is scanned for selecting a home base station belonging to the selected logical LAN, as a result of this scanning process the remote station builds a base station selection table from which it selects the base station with the strongest signal. Such selection may further involve listening to a given base station's signal at various frequencies to compute an average signal strength indicator taking into account frequency dependent fading conditions. The registering remote station sends a registration request packet to the selected base station carrying the list of the base station identifiers recorded in its selection table. This list is transmitted to the wireless network controller (WNC) by the wireless control agent (WCA) of the selected base station and is added to the list of neighbor base stations in the network topology directory entries corresponding to each one of the base station identifiers recorded in the selection table. Thus the network topology table is periodically updated by neighboring information provided by registering remote stations. Gathering such information relative to base stations overlaps can also be performed by active remote stations on a periodic basis and reported to the wireless network controller in a way similar to what has been described for registering base stations.

While the preferred embodiment of the invention relates to frequency hopping patterns assignment and more specifically frequency hopping patterns reuse. The method of the invention is applicable to reuse and assign to a requesting base station other network resources such as for instance base stations identifiers. When utilized for reusing base stations identifiers BASE__ID the method of the invention comprises building a distance table of the form:

TABLE 2

| Base station identifier | Base Station name | Distance value D |
|---|---|---|
| BASE__ID1 | BASE__NAME(i) | MAX |
| ... | ... | ... |
| BASE__ID2 | BASE__NAME(j) | 3 |
| ... | ... | ... |
| BASE__ID3 | BASE__NAME(k) | 1 |
| ... | ... | ... |
| BASE__IDm | BASE__NAME(l) | MAX |
| ... | ... | ... |
| BASE__IDn | BASE__ID(p) | 2 |

Figure 14:
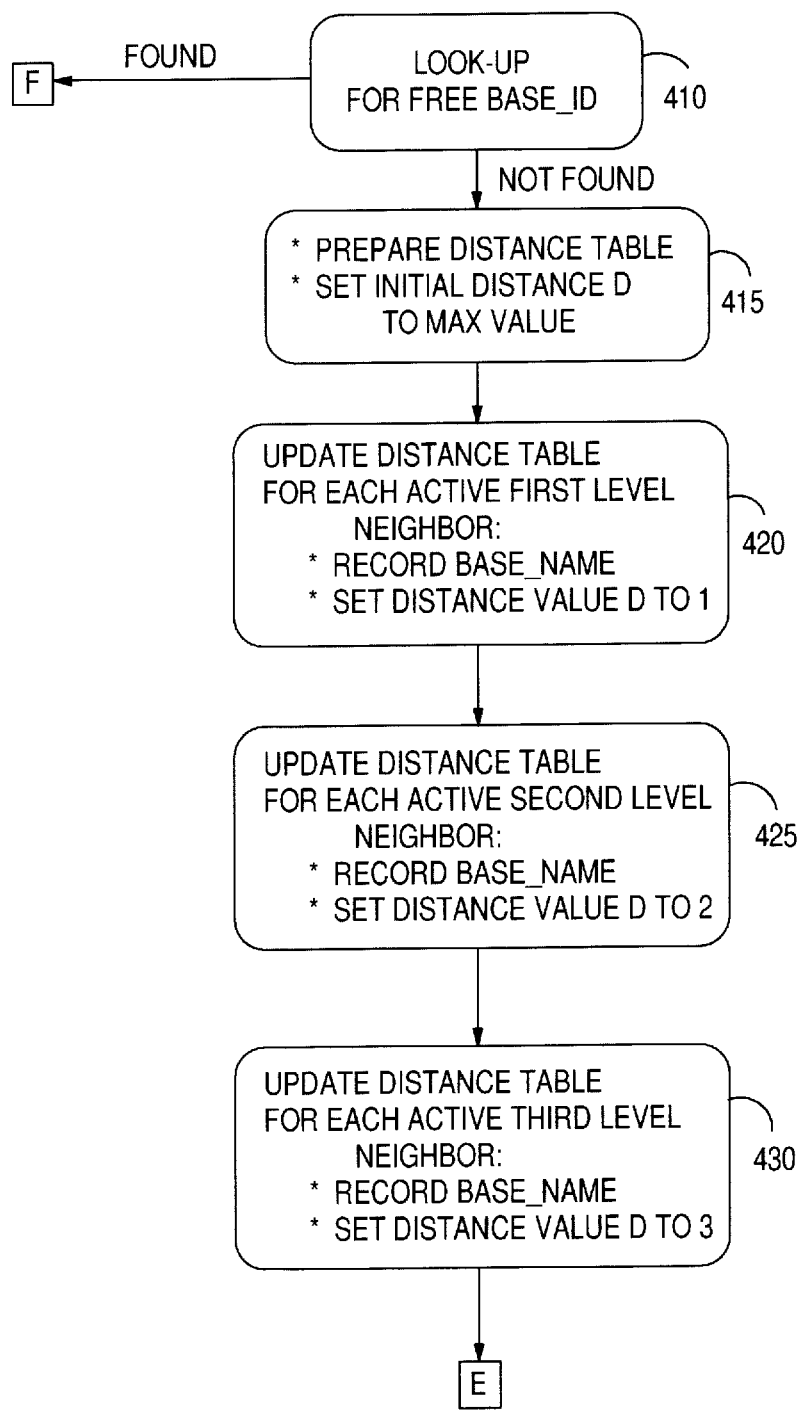
FIGS. 14 and 14A are flow diagrams of the process performed by the wireless network controller to reuse already assigned base stations identifiers.
Figure 14A:
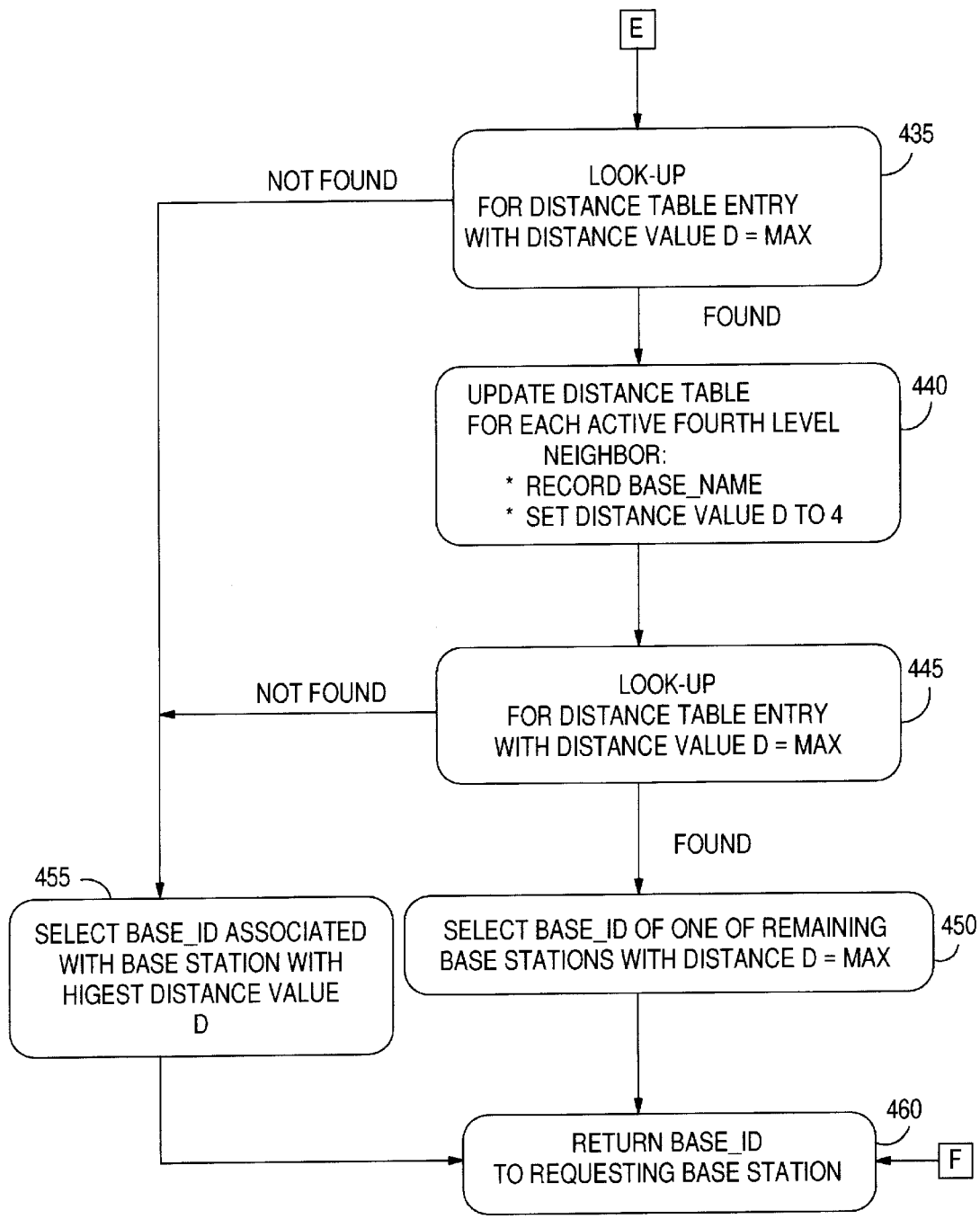

The first column of this distance table lists all the base stations identifiers used in the logical LAN, BASE__ID1 to BASE__IDn, the next column carries a unique base station identifier, in this particular example the base station name BASE__NAME( ) is assumed to provide such a unique base station identifier, the third column carries the distance value D. Assuming that this distance table carries distances to a requesting base station whose name is BASE__NAME(m), the first line in this table indicates that BASE__NAME(i) is not a direct nor indirect neighbor of BASE__NAME(m) and that BASE__NAME(i) has been assigned BASE_ID1 as base station identifier BASE__ID( )in the network topology table 230. Therefore BASE__ID1 can be reused by BASE__NAME(m). Similarly, the next line indicates that BASE__ID2 has been assigned to BASE__NAME(j) and that BASE__NAME(j) is a third level neighbor of BASE__ID(m). The method used to build this distance table follows the same logic flow as the method described above in relation to FIGS. 13 and 13A wherein base stations identifiers (BASE__ID) are substituted to frequency hopping patterns and base station names (BASE__NAME) are substituted to base stations identifiers as shown in FIGS. 14 and 14A. In step 410 the network controller looks for a free BASE__ID. If there is no free FHP it prepares in step 415 the distance table of Table 2 and sets all values of distance D to a maximum value MAX. In step 420 the process updates distance table entries corresponding to first level neighbors of the requesting base station. For those first level neighbor base stations whose status is active, the process updates the entry in the distance table corresponding to their assigned BASE__ID with the first level neighbor unique name BASE__NAME and sets the value of D to 1. Step 425 is similar to step 420, the network controller updates distance table entries corresponding to the base stations identifiers BASE__ID assigned to second level neighbors with the second level neighbor BASE__NAME and set the corresponding distance D to 2. Step 430 updates the distance table for third level neighbors. In step 435 (FIG. 13A) the network controller looks up in the distance table for entries with a distance value of MAX. If all entries have distance values of 1, 2 or 3 the process selects in step 455 a BASE__ID associated with an entry with a distance of 3. It there are remaining entries with a distance of MAX the network controller updates in step 440 table entries corresponding to fourth level neighbors. Steps 445, 450, 455 and 460 perform the same processing as steps 345, 350, 355 and 360 in FIG. 13A wherein BASE__ID's are substituted to FH patterns.

While the system carrying out the preferred embodiment of the invention uses frequency hopping radio signaling, the method of the invention can be practiced on other kinds of wireless communication systems such as infrared (IR) systems.

We claim:

1. A communication system comprising a local area network (116) connected to a plurality of base stations (118, 120), each base station (118) having a geographic area, defined as a cell, within which remote stations (128, 132, 136) are within reception range with said each base station, said each base station being capable of performing bidirectional communication over a shared communication media with one or more of said remote stations under control of a controller (110) connected to said local area network, said system comprising:

(a) means in a given base station for sending a request to said controller for assigning, by said controller, a network resource; and (b) means in said controller for selecting and assigning to said given base station said network resource in response to said request, wherein the means in said controller further comprises means for calculating distance indexes between said given base station and other base stations and means for selecting the network resource already assigned to one of said other base stations with the highest distance index to said given base station.

2. The system of claim 1 wherein said network resources includes a pool of radio frequency hopping patterns used for performing bidirectional radio communication between said base stations and said remote stations.

3. The system of claim 2 wherein each said base station further comprises:

(c) means for monitoring interference relative to its assigned frequency hopping pattern;

(d) means for determining if frequency hopping pattern revision is necessary as the result of monitoring of interferences; and (e) means for requesting from said controller assignment of a new frequency hopping pattern if said revision is necessary.

* * * * *